(12) United States Patent
Kuzma

(10) Patent No.: US 7,754,174 B2
(45) Date of Patent: Jul. 13, 2010

(54) METHOD FOR PRODUCING TRI-CALCIUM PHOSPHATE

(75) Inventor: William M. Kuzma, Sesser, IL (US)

(73) Assignee: Natural Enrichment, LLC, Sesser, IL (US)

( * ) Notice: Subject to any disclaimer, the term of this patent is extended or adjusted under 35 U.S.C. 154(b) by 0 days.

(21) Appl. No.: 12/316,101

(22) Filed: Dec. 10, 2008

(65) Prior Publication Data

US 2009/0092533 A1 Apr. 9, 2009

Related U.S. Application Data

(63) Continuation of application No. 11/825,708, filed on Jul. 9, 2007, now abandoned.

(51) Int. Cl.
*C01B 25/32* (2006.01)

(52) U.S. Cl. .................................................. 423/311
(58) Field of Classification Search ................. 423/308, 423/309, 311
See application file for complete search history.

(56) References Cited

U.S. PATENT DOCUMENTS 5,082,566 A * 1/1992 Tagaya et al. ............... 210/656

* cited by examiner

*Primary Examiner*—Wayne Langel
(74) *Attorney, Agent, or Firm*—Paul M. Denk

(57) ABSTRACT

A method for producing tri-calcium phosphate admixes water, hydrated lime, and phosphoric acid in a reaction vessel to form a tri-calcium phosphate slurry. The slurry is then placed in physical contact with heated air through a spray head to evaporate water from the slurry. The preferred embodiment of the method utilizes an agitated air dryer.

2 Claims, 3 Drawing Sheets

METHOD FOR PRODUCING TRI-CALCIUM PHOSPHATE

CROSS-REFERENCE TO RELATED APPLICATIONS

This is a continuation patent application that claims priority to the non-provisional application having Ser. No. 11/825,708, filed on Jul. 9, 2007, now abandoned which claims priority to the non-provisional patent application having Ser. No. 10/950,043, filed on Sep. 25, 2004, and which claims priority from a provision patent application having Ser. No. 60/505,397, filed on Sep. 25, 2003, and the same provisional application having the same serial number as refiled on Dec. 4, 2003.

BACKGROUND OF THE INVENTION

This invention generally relates to tri-calcium phosphate production. More specifically, the present invention utilizes a production method with a spray head in combination with an agitated air dryer system.

Tri-calcium phosphate is the generic name for precipitated calcium hydroxyapatite. High-quality food-grade tri-calcium phosphate ("TCP") is used as a calcium supplement in products such as cereals, bakery mixes, dry gravy mixes, spice blends, flours, beverages, animal foods and pharmaceuticals. TCP is also used as an anti-caking agent in salt substitutes, dry beverage mixes, dry soup mixes, dry gravy mixes, spice blends and other hydroscopic food products that require flow conditioning. TCP also serves as a dispersant, a suspension agent for polymerization of styrene, and a ceramic coloring agent.

Currently, TCP slurries are produced by admixing water, hydrated calcium or lime (CaOH), and phosphoric acid in a stainless steel reaction vessel 7 in FIG. 1. A small amount of acetic acid is also added to control the viscosity of the slurry during the reaction and for passage through a surge tank 8. The slurry produced generally has a weight ratio of 72% water and 28% solid TCP. To produce a marketable TCP product, the slurry must be dried to remove the moisture.

The industry standard for removing the moisture is drying the slurry using a combination of steam heated double drum dryers, gas fired flash dryers 12, and air conveyance in FIG. 2. More specifically, drying TCP slurry by spreading it over a steam heated 11 double drum dryer 10 has much inefficiency. The granular characteristics, density and moisture content for different marketable TCP products are determined in the drying process. While the prior art drying techniques produce marketable TCP products, several drawbacks make these techniques less desirable. First, the prior art drying systems utilize a large amount of energy to operate. Approximately 3,750 BTU (British Thermal Units) are required to dry enough slurry to produce one pound of TCP at 2% moisture. The double drum dryer 10 employed has a small production capacity which increases production costs. The drums have a capacity of approximately 800 lbs to 900 lbs per hour. Finally, the double drum drying system generates excessive dust as the dried TCP is scraped from the drums and is dropped into conveyors. The finer particles become airborne and drift onto the surface of the dryer frame, and eventually onto the floor beneath the dryer. This finer material must be collected and disposed of as waste.

Therefore, an efficient TCP production method is needed that utilizes less water and energy for drying TCP to meet commercial needs.

SUMMARY OF THE INVENTION

The present invention is a method for producing tri-calcium phosphate. The method admixes water, hydrated lime, ascetic acid, and phosphoric acid in a reaction vessel to form a tri-calcium phosphate slurry, and then places the slurry in physical contact with air at a temperature sufficient to evaporate the water in the slurry.

The TCP slurry mixes with previously dried TCP (0%-2% moisture) to obtain a blended TCP product that has approximately 30% moisture content. This blend then feeds into an agitated air dryer (AGA) as manufactured by International Technology Systems, Inc., of Wisconsin.

The moisture in the blended TCP evaporates in the AGA dryer by a turbulent stream of heated air. The present invention resulted from different locations of slurry sprays relative to the dryer and various types and amounts of insulation placed upon the burner housing and the dryer itself. The air temperature at the inlet 5a of the dryer 5 will vary between 550° F. and 650° F. The air temperature at the outlet 5b of the dryer 5 will vary between 190° F. and 210° F. The hot moist air and dried product exit the dryer into a bag house B as in FIGS. 3, 4. The dry product drops to the bottom of the bag house where it splits into two product streams. One stream of dried TCP goes to packaging equipment 9 and along a packaging conveyor 9a. Another stream of product returns to the mixing equipment where it re-blends with the TCP slurry 6.

The hot moist air exits through the top of the bag house after passing through fabric bags. The fabric bags operate similar to the bags in a vacuum cleaner. The fabric bags allow the hot air to pass through, but not the fine, airborne TCP particles. This system keeps all the TCP contained and eliminates waste.

The AGA drying system uses approximately 1,500 BTU to produce one pound of TCP product with 2% moisture. This system requires about 40% of the energy used by the double drum drying system 10. The present invention produces approximately 1,650 lbs/hr of finished TCP. Furthermore, the temperature, turbulence and velocity of the air stream in the AGA drying system can be readily adjusted to produce various granulations and densities of the TCP to meet the specific requirements of a variety of products.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved method for producing tri-calcium phosphate.

Another object of the present invention is to combine the advantages of a spray dryer and an agitated air dryer.

Another object is to provide a method for producing tri-calcium phosphate that reduces waste of TCP by containing particulate TCP within the equipment.

Another object is to provide a method for producing tri-calcium phosphate that uses 40% of the energy of prior art methods to operate.

A still further object is to provide a method for producing tri-calcium phosphate that readily provides TCP of various granulations and densities.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

Variations and modifications to the subject matter of this invention may occur to those skilled in the art upon review of the development as described herein. Such variations, if within the spirit of this development, are intended to be encompassed within the scope of the invention as described.

BRIEF DESCRIPTION OF THE DRAWINGS

The same reference numerals refer to the same parts throughout the various figures.

DETAILED DESCRIPTION

Figure 1:
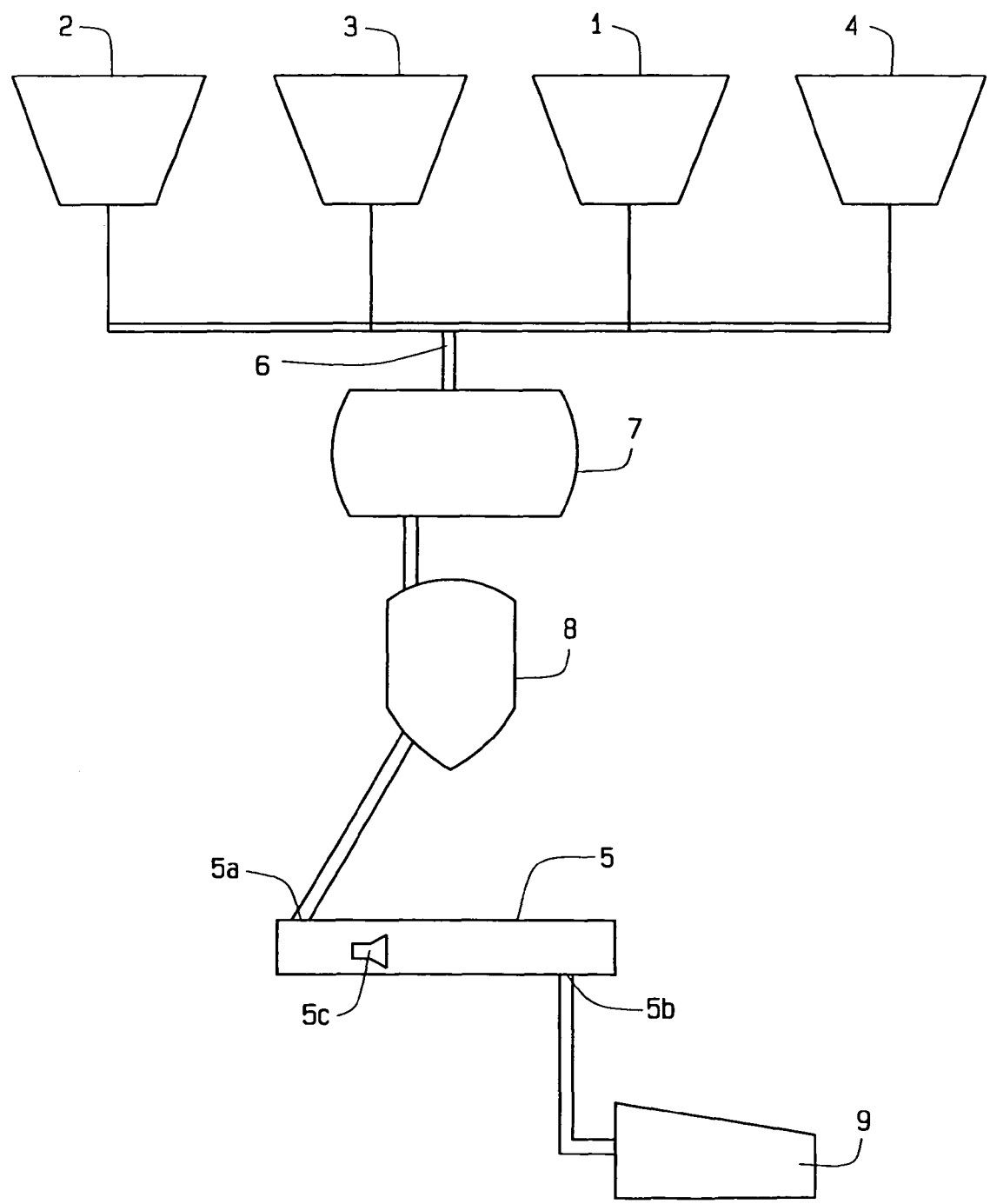
FIG. 1 is a flow chart illustrating the preferred embodiment of the method of the present invention.

A new and useful method for producing commercial tri-calcium phosphate, or TCP, utilizes less water and energy than current methods. TCP has the following chemical formula: $Ca_3(PO_4)_2$. The processes &the present invention produce a TCP product with less energy and less waste than the current methods. According to the method of the present invention in FIG. 1, water 1, hydrated lime 2, related ingredients such as acetic acid 4, and phosphoric acid 3 are admixed in a reaction vessel 7 to form a tri-calcium phosphate slurry 6. The resultant slurry 6 has approximately 72% water and 28% by weight of solid TCP. The slurry 6 then physically contacts air to remove the moisture from the slurry 6. To remove the moisture, the air temperature must reach the evaporation point of the moisture in the slurry 6. The heat of the chemical reaction is controlled to produce TCP having certain characteristics, such as fine particle or powdery form.

Figure 2:
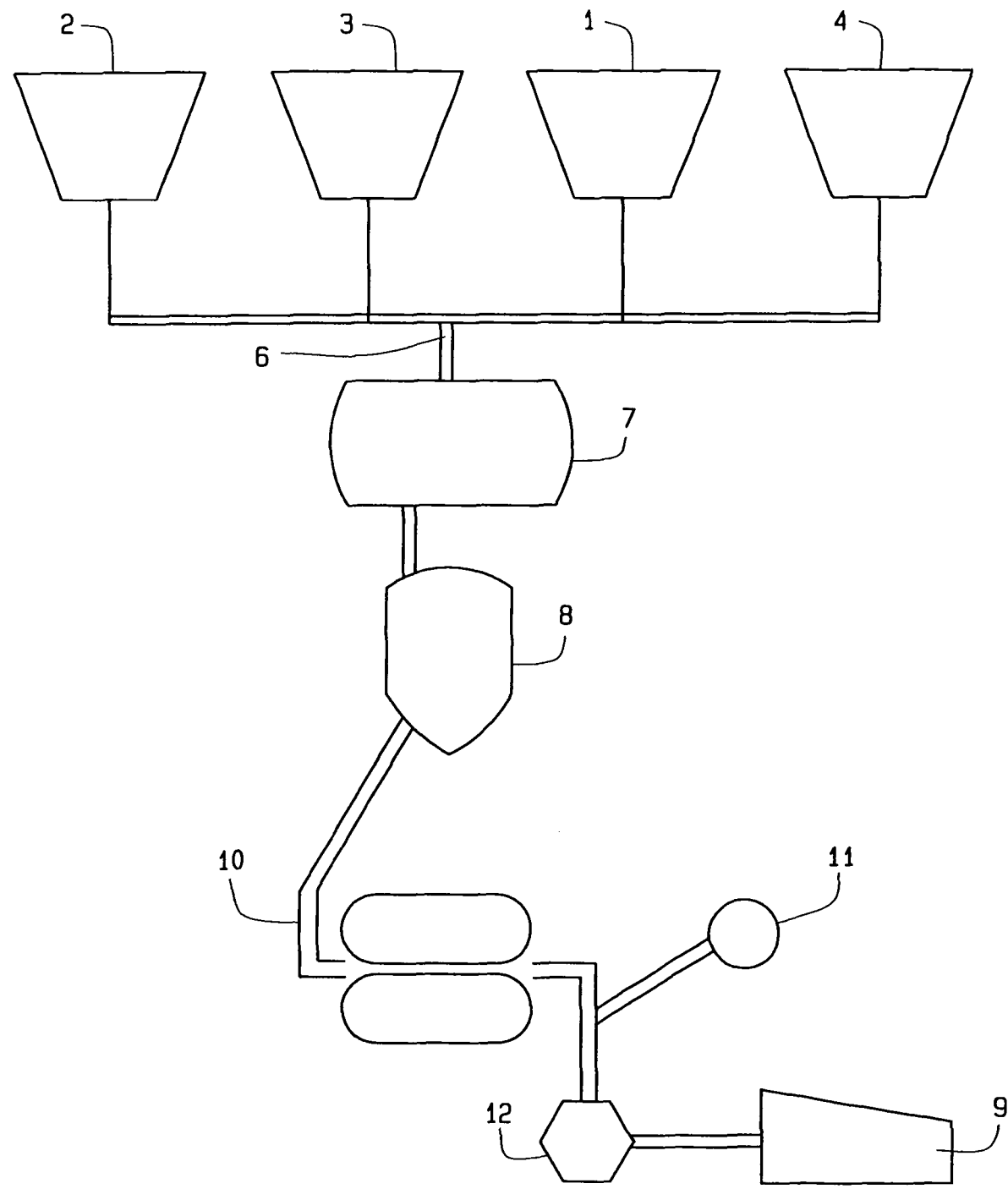
FIG. 2 is a flow chart illustrating the prior art method for producing tri-calcium phosphate.

In the preferred method of the invention, an agitated air or AGA system 5 dries the TCP slurry 6. Suitable AGA systems 5 may be obtained from International Technologies Systems, Inc. The agitated air system 5 utilizes a dispersion drum and paddles to separate the TCP slurry 6 into small particles so that a fast moving stream of hot air may remove the moisture in the slurry 6 through evaporation. In the preferred method of the invention, TCP slurry 6 is fed through a spray head 5c directly upon the dispersion drum of the dryer 5. In an alternate method, the dispersion drum has paddles. In addition, the AGA system 5 has a production capacity of about 1,300 lbs to about 2,000 lbs per hour, versus about 800 lbs to about 900 lbs per hour with the prior art dryers. Further, the AGA system 5 works more efficiently at lower moisture levels than current methods. A double drum drying system 10 of the prior art, as in FIG. 2, requires high moisture content TCP to distribute TCP evenly upon the surface of the drums. The granular characteristics, density and moisture for different marketable TCP products are determined largely by the dryer shaft speed, air volume and air temperature. Using the AGA system 5, negative air pressure moves the TCP slurry 6 through the system. This retains the product within the drying equipment. Dust from the production of the TCP remains and returns to the production line P using bag houses B.

Figure 3:
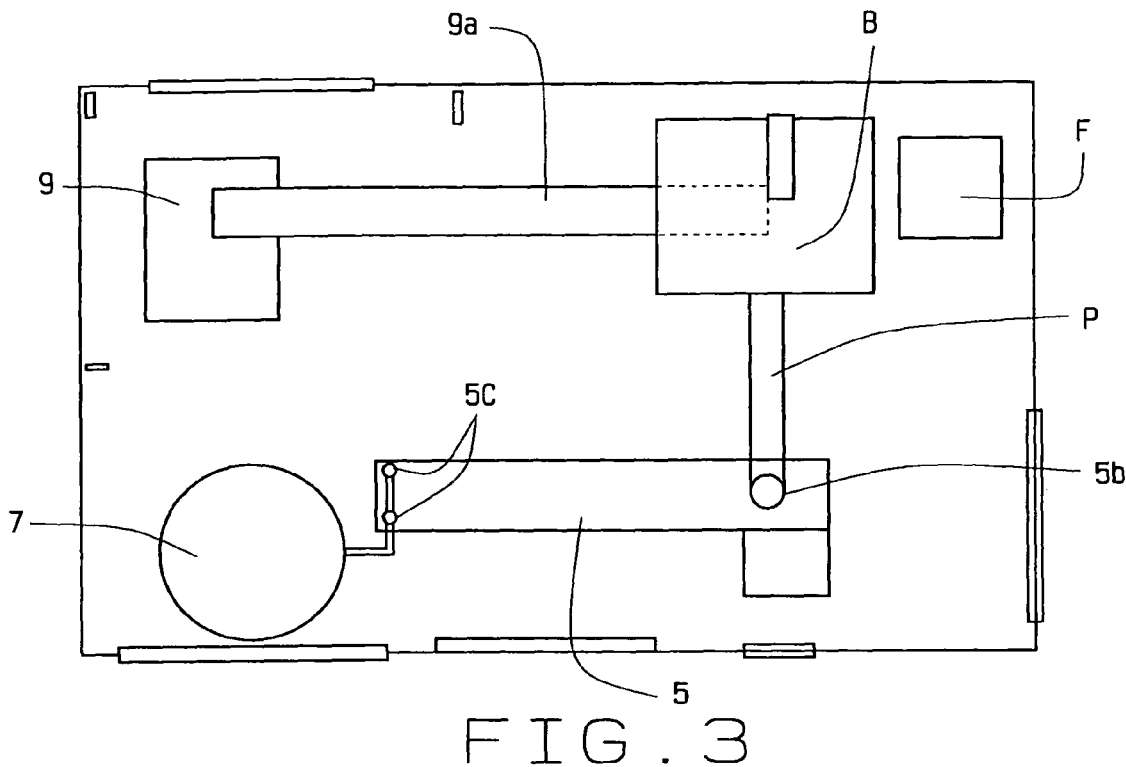
FIG. 3 is top view of the preferred embodiment of the present invention in a production environment; and, FIG. 4 is a side view of the preferred embodiment of the present invention in a production environment.

Turning to FIG. 3, the method of the present invention takes form in a production environment. Components are mixed and a slurry forms in the tank 7. From the tank 7, slurry 6 is piped to an agitated air dryer 5. The dryer 5 includes one or more spray heads 5c ahead of the inlet 5a. As moisture departs the slurry 6, the particulate TCP exits the dryer through the outlet 5b and proceeds into the production line P. The production line P leads to a baghouse B also connected to a fan F. As previously described, the baghouse B captures particulate TCP, releases air, and collects TCP in bulk. A conveyor 9a takes the bulk TCP into the packaging equipment 9 for further handling such as screening.

Figure 4:
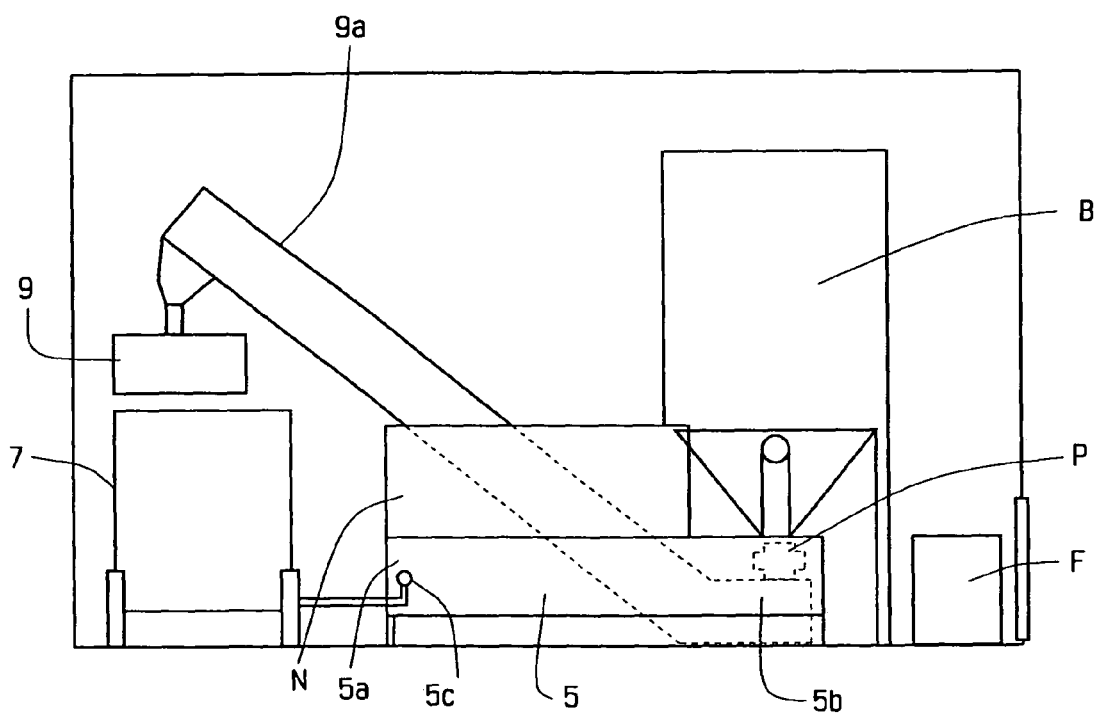

FIG. 4 shows the combination of the dryer and the spray head arranged for production of TCP. As in FIG. 3, slurry 6 departs the tank 7 and enters the dryer 5. Exiting the dryer 5, the TCP proceeds to the baghouse B through the production line P. To heat the air used in the dryer 5, a burner N mounts upon the dryer 5 and communicates heated air for evaporating moisture from the TCP. The dryer 5 admits the slurry 6 at the inlet 5a. Inside of the inlet 5a, one or more spray heads 5c disperse the slurry 6 under pressure upon the drums within the agitated air dryer 5. As the moisture content declines, the particulate TCP is evacuated from the dryer 5 through the outlet 5b and sent into the production line P.

The TCP produced using the method of the present invention may be used in various products, including but not limited to, foods, ceramics, bone meal, and beverages. The TCP products may also be used in polystyrene manufacturing. From the aforementioned description, a method for producing tri-calcium phosphate has been described. The production method is uniquely capable of drying a TCP slurry.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

It is to be understood that while certain embodiments of the invention are described and illustrated herein, the invention is not to be limited to the specific form or arrangement described and shown herein. It will be apparent to those skilled in the art that various changes may be made without departing from the scope and spirit of the invention, and the invention is not to be considered limited to what is shown and described herein.

I claim:

1. A method for producing dry marketable tri-calcium phosphate, combined from ingredients including water, hydrated lime, phosphoric acid, and acetic acid, comprising:

forming a tri-calcium phosphate slurry from said ingredients, including approximately 72% by weight of water, approximately 11% by weight of hydrated lime, approximately 16% by weight of phosphoric acid, and less than 2% by weight of acetic acid;

adding said acetic acid to said slurry so as to control the viscosity of said slurry during the reaction of said ingredients during mixing of said slurry;

placing said slurry within a heated air stream produced by an agitated air system having an agitated air dryer with an inlet and an outlet and at least one spray head located between said inlet and said outlet, so at least one spray head directly applies said slurry within the agitated heated and turbulent air stream within said dryer;

said slurry being introduced into said air dryer to agitate the slurry through operating paddles therein;

maintaining the temperature of said inlet of the air dryer at approximately 550° F. to approximately 650° F., and maintaining the temperature of said air outlet at approximately 190° F. to approximately 210° F.;

applying negative air pressure within said agitated air stream to move said slurry through said air dryer and to direct said slurry through said at least one spray head in contact with the stream of heated air to evaporate water from said slurry to produce a tri-calcium phosphate having a reduced moisture content less than an approximately 2% moisture content; and wherein said method produces tri-calcium phosphate at a rate of approximately 1,300 lbs to about 2,000 lbs per hour.

2. The method of claim 1, and further comprising;

dividing said tri-calcium phosphate produced by said method into two portions;

recycling one of said portions into the step of forming said slurry; and packing the other of said portions for delivery.

* * * * *